F. J. CROSS.
CUSPIDOR.
APPLICATION FILED JULY 7, 1906.
959,117.
Patented May 24, 1910.
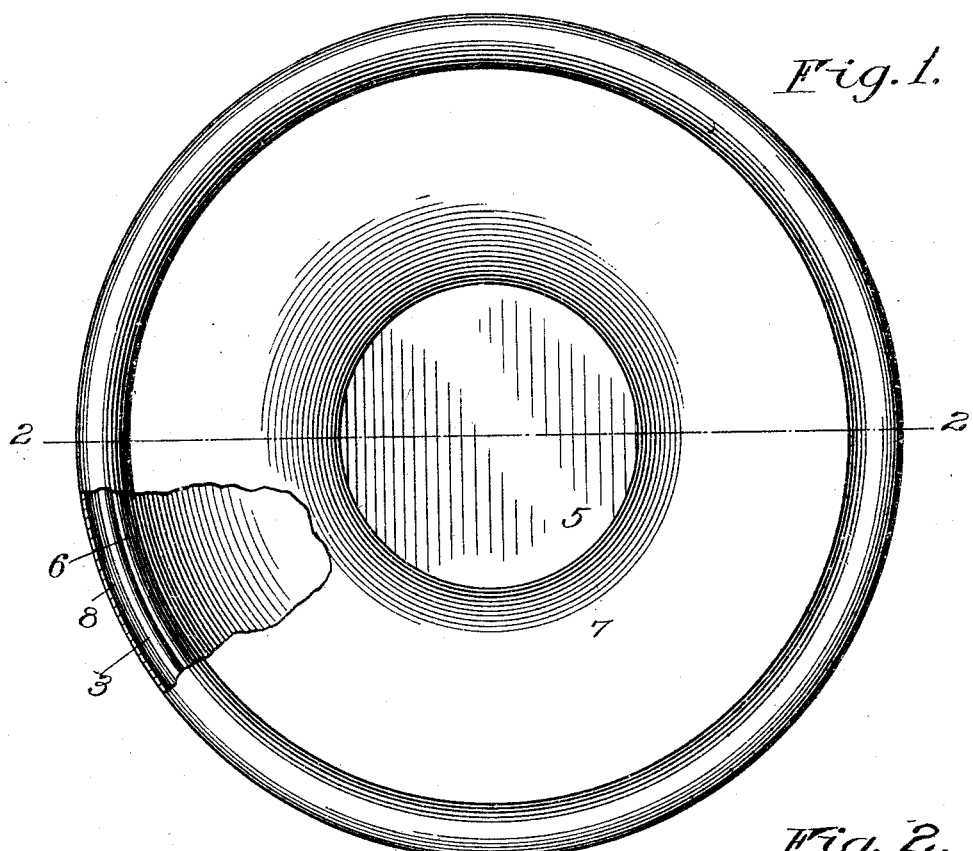
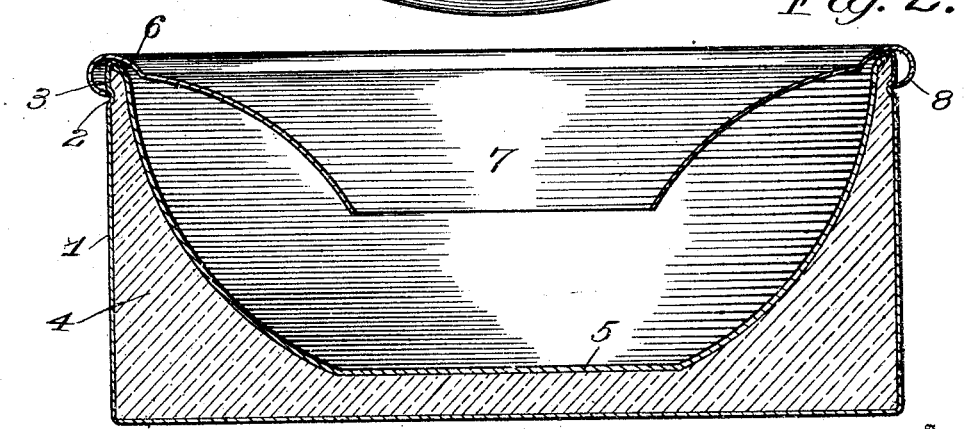

UNITED STATES PATENT OFFICE.

FREDERICK J. CROSS, OF ROCHESTER, NEW YORK, ASSIGNOR TO ROCHESTER STAMPING COMPANY, OF ROCHESTER, NEW YORK, A CORPORATION OF NEW YORK.

CUSPIDOR.

959,117. Specification of Letters Patent. Patented May 24, 1910.

Application filed July 7, 1906. Serial No. 325,066.

*To all whom it may concern:*

Be it known that I, FREDERICK J. CROSS, of Rochester, in the county of Monroe and State of New York, have invented certain new and useful Improvements in Cuspidors; and I do hereby declare the following to be a full, clear, and exact description of the same, reference being had to the accompanying drawings, forming a part of the specification, and to the reference-numerals marked thereon.

The present invention relates to improvements in cuspidors, and has for its object to provide a device of this kind that not only can be conveniently and thoroughly cleaned and has no inaccessible spaces or surfaces where bacteria or foul matter may accumulate and decompose, but it is so constructed that, while generally made of sheet metal or other thin material, it cannot become indented, crushed or otherwise distorted, nor is it liable to become overturned accidentally, and its novel construction enables such a device as described to be made very cheaply.

To these and other ends the invention consists in certain improvements and combinations of parts, all as will be hereinafter more fully explained, the novel features being pointed out in the claim at the end of the specification.

In the drawings: Figure 1 is a top plan view of a cuspidor constructed in accordance with my invention, a portion of the funnel edge being broken away for illustrative purposes. Fig. 2 represents a vertical section of the cuspidor on the line 2—2 of Fig. 1, and Fig. 3 represents on an enlarged scale, the relative arrangement of the rims of the shell, bowl and funnel.

Similar reference numerals in the several figures indicate similar parts.

In the present embodiment of the invention, the cuspidor comprises an outer shell 1, preferably stamped into the desired form from sheet metal, having an opening at the top and formed with a circumferential groove or reduced portion 2 formed therein near its upper edge to form a shoulder 3 above it for a purpose to be hereinafter described. The inner walls of this shell are backed up by a solid filling or lining 4 composed preferably of a plastic substance which, when soft, is capable of molding itself perfectly to the shape of the shell at all points, and when hard or solidified, will serve as a firm and non-yielding backing for the shell, cement for instance serving advantageously for this lining or filling.

The bowl for the saliva is arranged within or inclosed by this backing or lining, and although this plastic backing can be easily molded into shape and suitably glazed to form a bowl in itself, it is preferable to employ a separate bowl 5 of sheet material suitably stamped preferably into hemispherical form, and if desired, glazed or lined with porcelain to facilitate cleansing. The bowl is of such a size and shape that its rim 6 will just fit within and slightly below the rim of the outer shell, and by crimping the rim of the latter inwardly, an overlying flange is formed which not only rests above the rim of the bowl to securely hold the latter in place, but it closes or seals the joint formed between the shell and bowl, and thereby prevents entrance or lodgment of foul matter which would give rise to disagreeable odors.

The funnel or conical cap 7 may be of any suitable shape, and is preferably stamped from sheet metal with an inturned flange 8 on its rim, the diameter of the edge of this flange being just sufficient to enable it to slip over the annular shoulder 3 and rest in the circumferential groove or reduced portion 2 in the shell, so that the funnel may be readily detached for cleaning and polishing, while, when it is in position, the coöperation of the flange of the funnel with the groove of the base, prevents accidental displacement of the funnel when the cuspidor is kicked or otherwise jarred.

It is particularly advantageous to provide a firm or solid backing for the outer shell, as it is desirable to form the latter of stamped metal which must necessarily be comparatively thin, and unless it is suitably backed, it would soon become indented, crushed or otherwise distorted, so as to render the cuspidor useless, and plastic material is especially adapted for use as a backing for holding the shell in shape, as it may be easily applied to the shell before the bowl is fitted therein. Molding itself perfectly to the shape of the shell, and before the setting of the cement or other material employed, the bowl may be pressed into the plastic material until its rim is in proper relation to the rim of the shell, the plastic material thus not only conforming to the shape of the shell, but also molding itself to the exact shape of the bowl, and when the plastic material sets or hardens, the shell and bowl will have a backing sufficiently hard and fitting so closely at every point as will hold the shell to its shape and prevent indenting or crushing thereof.

As the bowl is preferably hemispherical while the inclosing shell has substantially parallel vertical sides, the greatest space between the bowl and shell will be at the bottom of the cuspidor, and will decrease toward the top thereof, and therefore the backing or other material filling this space, serves the important purpose of lowering the center of gravity to the bottom of the cuspidor, and this will prevent tipping or overturning of the cuspidor.

A cuspidor embodying my invention may be readily and cheaply made of sheet material stamped into form and by employing plastic material as a backing, it may be readily assembled, as the backing conforms exactly to the shape of the shell and bowl without requiring any particular care, skill or time of the workman, and the novel arrangement of the parts insures cleanliness in the use of the cuspidor as it may be conveniently and thoroughly cleaned, and there are no inaccessible spaces or surfaces for the accumulation of bacteria or foul matter.

I claim as my invention:

A cuspidor embodying a cup-shaped shell made from sheet material and provided with an annular depression in its edge, a bowl arranged within the shell, formed of sheet material and seamed to the shell above the depression, a solid body formed from plastic material and completely filling the space between the shell and the bowl, the body being engaged by the depressed portion of the shell so as to be held within the latter, and a funnel formed with an inturned flange on its rim, the edge of the flange being arranged to prevent accidental displacement of the funnel.

FREDERICK J. CROSS.

Witnesses:
CLARENCE A. BATEMAN,
FLORENCE E. FRANCK.